(12) United States Patent
Ashutosh et al.

(10) Patent No.: US 7,386,545 B2
(45) Date of Patent: Jun. 10, 2008

(54) SYSTEM AND METHOD FOR DISAMBIGUATING ENTITIES IN A WEB PAGE SEARCH

(75) Inventors: Garg Ashutosh, Sunnyvale, CA (US); Ramanathan Guha, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 11/095,273

(22) Filed: Mar. 31, 2005

(65) Prior Publication Data
US 2006/0224565 A1    Oct. 5, 2006

(51) Int. Cl.
G06F 17/30    (2006.01)
(52) U.S. Cl. ............................................. 707/5
(58) Field of Classification Search ............ 707/3–6
See application file for complete search history.

(56) References Cited

U.S. PATENT DOCUMENTS

| | | | |
|---|---|---|---|
| 4,283,621 A | 8/1981 | Pembroke | |
| 5,140,522 A | 8/1992 | Ito et al. | |
| 5,416,896 A | 5/1995 | Motoyama | |
| 5,864,845 A | 1/1999 | Voorhees et al. | |
| 5,864,846 A | 1/1999 | Voorhees et al. | |
| 5,926,812 A | 7/1999 | Hilsenrath et al. | |
| 5,933,823 A | 8/1999 | Cullen et al. | |
| 5,983,221 A | 11/1999 | Christy | |
| 6,029,167 A | 2/2000 | Evans | |
| 6,029,175 A | 2/2000 | Chow et al. | |
| 6,049,799 A | 4/2000 | Mangat et al. | |
| 6,141,653 A | 10/2000 | Conklin et al. | |
| 6,181,342 B1 | 1/2001 | Niblack | |
| 6,263,121 B1 | 7/2001 | Melen et al. | |
| 6,332,135 B1 | 12/2001 | Conklin et al. | |
| 6,336,105 B1 | 1/2002 | Conklin et al. | |
| 6,338,050 B1 | 1/2002 | Conklin et al. | |
| 6,353,840 B2 | 3/2002 | Saito et al. | |
| 6,418,434 B1 | 7/2002 | Johnson et al. | |
| 6,633,868 B1 | 10/2003 | Min et al. | |
| 6,711,586 B1 | 3/2004 | Wells | |
| 6,785,669 B1 | 8/2004 | Aggarwal et al. | |

(Continued)

OTHER PUBLICATIONS

David Howard, "You are Here—Still Lost? A Cadre of New Companies Want to Show You the Way." New Architect, http://www.newarchitectmag.com, Jan. 2003, 6 pages total.

(Continued)

Primary Examiner—Diane Mizrahi
(74) Attorney, Agent, or Firm—Gibb & Rahman, LLC (57) ABSTRACT

A system and method of disambiguating entities in a computerized web search includes identifying a set of potential meanings for an entity; retrieving at least one web page having descriptions referencing the entity; establishing a base web page having a selected context for the entity; attributing dimensions of a vector space attributed to domains in the retrieved web page; and computing a probability of similarity between the referenced entity in the retrieved web page and the entity in the base web page. The method includes corresponding a similarity measure between the dimensions of the vector space attributed to domains in the retrieved web page and a likelihood of the retrieved web page referring to the entity in the base web page. The method further includes ranking web pages based on the computed probability of similarity.

14 Claims, 7 Drawing Sheets

U.S. PATENT DOCUMENTS

| | | |
|---|---|---|
| 7,031,909 B2 * | 4/2006 | Mao et al. ............... 704/9 |
| 7,133,862 B2 * | 11/2006 | Hubert et al. ............ 707/3 |
| 2001/0042083 A1 | 11/2001 | Saito et al. |
| 2001/0047351 A1 | 11/2001 | Abe |
| 2002/0029232 A1 * | 3/2002 | Bobrow et al. ............ 707/517 |
| 2002/0042789 A1 | 4/2002 | Michalewicz et al. |
| 2002/0156763 A1 * | 10/2002 | Marchisio ............... 707/1 |
| 2003/0009440 A1 | 1/2003 | Inaba et al. |
| 2003/0023664 A1 | 1/2003 | Elmer |
| 2003/0061200 A1 | 3/2003 | Hubert et al. |
| 2003/0065658 A1 | 4/2003 | Matsubayashi et al. |
| 2003/0088550 A1 | 5/2003 | Menashe |
| 2003/0154071 A1 | 8/2003 | Shreve |
| 2003/0187834 A1 | 10/2003 | Oda et al. |
| 2004/0128616 A1 | 7/2004 | Kraft |
| 2004/0205059 A1 | 10/2004 | Nishioka et al. |

OTHER PUBLICATIONS

Susan Feldman, "The Answer Machine," Searcher, The Millennium Issue, vol. 8, No. 1, Jan. 2000, 30 pages total.

* cited by examiner

SYSTEM AND METHOD FOR DISAMBIGUATING ENTITIES IN A WEB PAGE SEARCH

BACKGROUND

1. Field of the Invention

The embodiments of the invention generally relate to web page searching and indexing and, more particularly, to a streamlined system and process to facilitate efficient web page searching.

2. Description of the Related Art

Generally, a large number of searches on web search engines refer to entities such as people, organizations, and places. However, there may be many different people, organizations, and places that are referred to on web pages, which have the same name, but are, in fact, distinct entities. For example, given the search query "Charles Smith", a typical search engine may retrieve references to 12-15 different people named "Charles Smith" in the first 20 results alone. This is a problem (hereinafter "identified problem") with not just the names of people.

For example, the search query "Asha" retrieves pages relating to an educational charity called Asha, the American Speech and Hearing Association, the singer Asha Bhosle, the American Saddle Horse Association, the American Social Health Association, etc. In any one search, a user is likely searching for information about only one of these entities. To filter the pages referring to only about one particular use of Asha (hereinafter, the term Asha will be used in the generic sense; i.e., to refer to the entity denoted by the query, and the term 'Asha' will refer to the word or phrase), a user may be forced to augment the query with additional terms that are likely to occur on pages referring to that particular use of Asha, which the user is searching for. For example, if a user wants to search for information regarding the singer "Asha Bhosle" but did not know the singer's last name, the user may augment the query with additional terms such as "singer" or "music" or "musician", etc.

Sometimes, one particular entity, which is not the one the user is looking for, dominates the search results. For example, the search "Michael Jordan" mostly retrieves pages about the famous basketball player. This is a problem if the user happens to be searching for information about someone else named Michael Jordan, for example, an individual named "Michael Jordon" who may be a high school teacher in Akron, Ohio. Again, the user is generally forced to contort the query in an attempt to eliminate the unwanted pages. This process not only places an additional burden on the user, but also often results in valid pages being left out of the results.

Taking the example of the search query for Asha, one of the problems of disambiguating different denotations of 'Asha' can be seen as a special case of the conventional word sense disambiguation (WSD) problem which has been previously studied. However, there are some major differences between WSD and the problem identified above, which makes the traditional approaches to WSD inappropriate for the identified problem. WSD has generally dealt with the problem of identifying the word sense of a particular use of a word such as "bank", which might refer to either a financial bank or a river bank. Typically, the problem is that of distinguishing between the two to four possible alternative meanings of a particular word, all of which are a priori known. This is done by using linguistic properties of the word, domain knowledge, or by looking for commonly co-occurring words. Further, from a linguistic and common sense domain knowledge perspective, all of the denotations are equally plausible.

Some conventional approaches look at the problem of the semantically same record (i.e., set of n-tuples), with erroneous syntactic variations (such as an address being written differently) in some of the fields, appearing as different records in the same database (such as the census database). The goal is to correctly link these duplicate records. In this approach, it is determined which field values are actually the same. However, the identified problem is different from this record linkage problem in two important ways. First, in the present context, even if everything two pages say about the Asha on the two pages is the same, it might not follow that the Ashas denoted by the two pages are, in fact, the same. For example, two pages might simply say that the person is called Asha and is a resident of the United States, from which one cannot conclude that they are the same. Second, different pages are likely to have very different kinds of information. One might identify the person based on his/her organizational affiliation and another based on the books he/she has written and, as such, it would be advantageous to still be able to co-identify them, if indeed they are the same.

Conventionally, a number of popular search engines provide a feature for retrieving similar or related pages. These features are aimed at retrieving pages that are overall similar to the page under consideration. Consequently, most of the pages they retrieve might not even refer to the original search query. For example, according to one of the most popular search engines, one of the top search results for the query "Barbara Johnson" is the web page for the Barbara Johnson who previously ran for governor of Massachusetts. Over half of the retrieved pages that are similar to this do not even contain the term "Barbara Johnson". This is to be expected since the similarity is defined just as a function of the page, and not of the user's original query.

This problem is closely related to the much studied Information Retrieval problem of relevance feedback, which typically involves finding documents similar to a given document. As it relates to the identified problem, a precise definition is given of the sense in which two documents are to be considered similar; i.e., they refer to the same Asha. With this definition, one can measure the performance of different methodologies.

However, the conventional approaches have not generally worked well for web page searching and retrieval. Therefore, while the conventional approaches were sufficient for the purpose they were intended for, there remains a need for a novel entity disambiguation technique capable of being used in web page searching and retrieval.

SUMMARY

In view of the foregoing, an embodiment of the invention provides a method of disambiguating entities in a computerized web search and a program storage device implementing the method, wherein the method comprises identifying a set of potential meanings for an entity; retrieving at least one web page comprising descriptions referencing the entity; establishing a base web page comprising a selected context for the entity; attributing dimensions of a vector space attributed to domains in the retrieved web page; and computing a probability of similarity between the referenced entity in the retrieved web page and the entity in the base web page, wherein the entity may comprise any of a word and phrase, and wherein the dimensions may comprise any of an object and a word.

Preferably, the at least one web page comprises a plurality of web pages, wherein each web page comprises a description of the entity that matches a search entity chosen for a search query, and wherein the base web page is selected from one of the web pages. Moreover, the process of computing the probability of similarity comprises corresponding a similarity measure between the dimensions of the vector space attributed to domains in the retrieved web page and a likelihood of the retrieved web page referring to the entity in the base web page. Preferably, the method further comprises ranking web pages based on the computed probability of similarity.

Another embodiment of the invention provides a system for disambiguating entities in a computerized web search, wherein the system comprises a user interface adapted to identify a set of potential meanings for an entity; a search engine connected to the user interface and adapted to retrieve at least one web page comprising descriptions referencing the entity; and a processor adapted to establish a base web page comprising a selected context for the entity; attribute dimensions of a vector space attributed to domains in the retrieved web page; and compute a probability of similarity between the referenced entity in the retrieved web page and the entity in the base web page, wherein the entity preferably comprises any of a word and phrase, and wherein the dimensions preferably comprise any of an object and a word.

Preferably, the at least one web page comprises a plurality of web pages, wherein each web page comprises a description of the entity that matches a search entity chosen for a search query, and wherein the base web page is selected from one of the web pages. Additionally, the processor is preferably adapted to correspond a similarity measure between the dimensions of the vector space attributed to domains in the retrieved web page and a likelihood of the retrieved web page referring to the entity in the base web page. Furthermore, the search engine is preferably adapted to rank web pages based on the computed probability of similarity.

The embodiments of the invention define a new vector space called a description subspace and devise similarity measures that correlate very well with confidence. For the search engine to filter the results so that the results only refer to the particular entity the user intended, the user has to be able to communicate which particular entity he/she intended. Since any given page typically refers to only one particular entity (referred to by the search query), if the user can easily communicate to the system that he/she is referring to the entity named by the search query referred on a particular page (or more generally, in a particular context), the search engine can take it from there. The embodiments of the invention work with many thousands, if not tens of thousands of possible distinct denotations, none of which might be a priori known to a user.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for an entity disambiguation technique capable of being used in web page searching and retrieval. The embodiments of the invention achieve this by providing a novel technique for disambiguating entities on web pages. Referring now to the drawings and more particularly to FIGS. 1 through 7 where similar reference characters denote corresponding features consistently throughout the figures, there are shown preferred embodiments of the invention.

Figure 1:
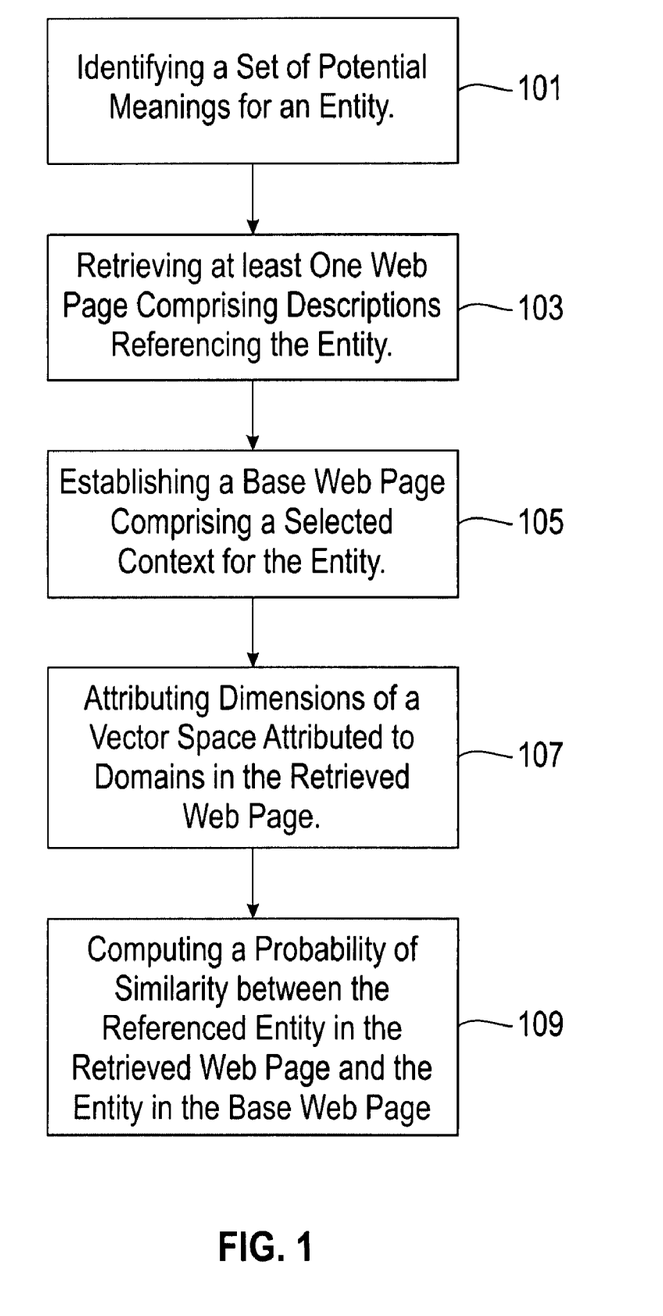
FIG. 1 is a flow diagram illustrating a preferred method according to an embodiment of the invention.

FIG. 1 illustrates a flow diagram describing a preferred method of disambiguating entities in a computerized web search, wherein the method comprises identifying (101) a set of potential meanings for an entity; retrieving (103) at least one web page comprising descriptions referencing the entity; establishing (105) a base web page comprising a selected context for the entity; attributing (107) dimensions of a vector space attributed to domains in the retrieved web page; and computing (109) a probability of similarity between the referenced entity in the retrieved web page and the entity in the base web page, wherein the entity may comprise any of a word and phrase, and wherein the dimensions may comprise any of an object and a word. Preferably, the at least one web page comprises a plurality of web pages, wherein each web page comprises a description of the entity that matches a search entity chosen for a search query, and wherein the base web page is selected from one of the web pages.

Moreover, the process (109) of computing the probability of similarity comprises corresponding a similarity measure between the dimensions of the vector space attributed to domains in the retrieved web page and a likelihood of the retrieved web page referring to the entity in the base web page. Preferably, the method further comprises ranking web pages based on the computed probability of similarity.

Generally, the embodiments of the invention provide a new technique of relevance feedback through which a user can provide feedback and have a search engine sort the results so that pages that refer to the particular Asha that he/she is searching for appear at the top (hereinafter, the "selection problem") of the results. In the case where an Asha other than the one the user is searching for dominates the results, the user can have the search engine remove the pages corresponding to that entity (hereinafter, the "elimination problem"). The particular application, which the embodiments of the invention are directed to, is web searching, although the approach(es) provided by the embodiments of the invention may be extended to other applications as well. Accordingly, as demonstrated below, other conventional approaches that work with other collections, such as stories from a newspaper, often do not work with a messy corpus such as the World Wide Web. Most pages on the web are not coherent stories expressed as a sequence of grammatical sentences. They use tables, frames, and many other constructs to convey their meaning. They often tend to be small snippets about a variety of different, often unrelated topics, mixed in with text that is there for navigation purposes.

In the context of the identified problem, it is important that the user be able to easily indicate which Asha he/she is referring to. Since any given web page typically refers to only one particular Asha, if the user can easily communicate to the system provided by an embodiment of the invention that he/she is referring to the Asha referred on a particular page (or more generally, in a particular context), the search engine can run more efficiently.

With a web search engine, the embodiments can use data sources such as census data provided by the U.S. Census Bureau as well as other sources of data to detect whether the search query contains an entity name. The search results interface can then be modified as indicated below to enable the user to inform the search engine about the intended denotation.

Asha

Asha For Education. . . .

www.ashanet.org/-This Asha

American Speech and Hearing Association

Welcome to Asha: To navigate this site . . .

National organization and governing body . . .

www.asha.org/-This Asha

When a user clicks on the link This Asha next to a particular search result, the search engine is expected to reorder the (first few thousand) search results so that the pages that refer to the Asha on the that page are ranked more highly. Hereinafter, this page identified by the user will be referred to as the "base page" or the "base web page." If a user clicks on the This Asha link next to the $n_{th}$ result, this can be interpreted both as specifying that he/she is looking for the Asha in that document, but also that the Ashas in the first n−1 results are not the same as this Asha.

The experimental set up that is used to extract the documents referring to the same Asha as the base web page is as follows. For a set of 26 common entity names, 150 of the top 1000 search results are randomly selected from a popular search engine. After eliminating pages which are not amenable to text analysis, this leaves a collection of 3,336 pages. Then, 2-6 particular entities (some examples of which are given in Table 2 below) are identified for each name and are tagged for each of the pages in the corpus that refer to the entity with a label corresponding to that entity. As the samples in Table 2 show, the entities include people, places, organizations, music groups, products, etc. Of the 3,336 pages, 2,609 are hand labeled with one of the 132 entities that they refer to. For this set of experiments, base web pages corresponding to 20 entities (10 people, 5 places and 5 organizations) across 10 different names (see Table 1) are selected out of this corpus, to evaluate the different approaches.

TABLE 1

Names of entities used in the evaluation

| Michael Jordon | Greenway | Washington |
| Lisa Brown | John Taylor | Springdale |
| Mustang | Barbara Johnson | Asha |
| John Thompson | | |

TABLE 2

Some of the entities associated with some of the names used in the evaluation

| Asha | Asha for Education, American Speech and Hearing Assoc., American Saddle Horse Assoc., Asha Bhosle (Singer) |
| Lisa Brown | British Rock group, Senator from Spokane, Canadian Boxer, AOL Executive |
| Mustang | Automobile, Horse, Mustang, Oklahoma, Mustang Survival |
| Washington | George Washington, the state, U.S. capital, Univ. of Washington, Washington Univ. St. Louis |

Each labeled page, for each of the 20 entities used in the experiment, is considered as a base web page. A methodology is used to sort all of the pages in the corpus (corresponding to the same name/query as the base web page, including those pages that refer to an entity not in the 20 used in the experiment) and a performance metric is computed for the above-referenced selection and elimination problems. The present performance metric for a given base web page is the number of correct results in the top N (for N=1 . . . 40) results divided by min(N, K) where K is the number of pages in the corpus that refer to the same Asha as the base web page. For the selection problem, a correct result is one which refers to the same Asha as the base web page. For the elimination problem, a correct result is one which refers to a different Asha. The performance metric is averaged over all the labeled pages. Intuitively, this measure captures the fraction of pages about the Asha in the top results.

For example, taking the query "Lisa Brown" as an example. One of the entities in the corpus named "Lisa Brown" is the senator from Spokane. A document that is labeled to refer to her is selected and all the documents which refer to any "Lisa Brown" is sorted based on their likelihood of referring to the senator as per the methodology being evaluated. For the selection problem, the performance is evaluated by counting the number of pages in the top N (N=1 . . . 40) pages that refer to the senator and divided by min(N, K). For the elimination problem, the number of pages that refer to a "Lisa Brown" other than the senator are counted. Using this approach, the experimental setup yields a total of 317 base web pages (one corresponding to each of the pages mentioning one of the 20 entities), each being compared to an average of 76.4 other pages, each of which also refers to an entity with the same name as the Asha on the base web page.

Since most search engines include ten results per page as the default, and since most users typically may not look beyond the first page, the experimental setup sets N=10. To determine the adequacy of each approach, the average of the performance over the 20 entities for the case where N=10 is reviewed; i.e., the average fraction of correct answers in the top ten search results. The results provided are broken down by the type of the entity.

In the corpus, a random choice methodology; i.e., one which randomly sorts the documents, will achieve a precision of 20.7% for N=10; i.e., on an average, two of the first ten documents will refer to the same Asha as the base web page.

In a vector space approach the similarity between documents modeled as vectors of words are computed. Each document is an N-dimensional vector, where each dimension corresponds to a word (or phrase) in the vocabulary and the coordinates of a document along a particular dimension is a measure of the role of that word in that document normalized over the corpus. The similarity between two documents is the cosine of the angle or distance between the (normalized) vectors corresponding to the two documents.

In order to evaluate the performance of this approach on web pages, it is implemented in the experimental setup described earlier. More details of the implementation are given below. The results obtained are shown in Tables 3 through 6 and FIGS. 2 through 5.

TABLE 3

Results (in percentages) of the three methods for the selection problem for N = 10 over the entire document

| Entity Type | TFIDF on Vector Space | INS on Desc. Subspace | TFIDF on Desc. Subspace |
|---|---|---|---|
| People | 26 | 93.5 | 94.0 |
| Places | 14.1 | 73.6 | 67.2 |
| Organizations | 33.7 | 87 | 86.7 |
| Overall | 23.9 | 85.3 | 84.2 |

TABLE 4

Results (in percentages) of the three methods for the selection problem for N = 10 over the window of 100 words around the query

| Entity Type | TFIDF on Vector Space | INS on Desc. Subspace | TFIDF on Desc. Subspace |
|---|---|---|---|
| People | 37.1 | 83.9 | 69.5 |
| Places | 32.8 | 85.0 | 60.4 |
| Organizations | 45.3 | 83.5 | 78.1 |
| Overall | 36.2 | 83.0 | 69.1 |

TABLE 5

Results (in percentages) of the three methods for the elimination problem for N = 10 over the entire document

| Entity Type | TFIDF on Vector Space | INS on Desc. Subspace | TFIDF on Desc. Subspace |
|---|---|---|---|
| People | 79.2 | 94.5 | 94.4 |
| Places | 84.3 | 100 | 99.9 |
| Organizations | 83 | 92.9 | 92.9 |
| Overall | 81.3 | 95.6 | 95.2 |

TABLE 6

Results (in percentages) of the three methods for the elimination problem for N = 10 over the window of 100 words around the query

| Entity Type | TFIDF on Vector Space | INS on Desc. Subspace | TFIDF on Desc. Subspace |
|---|---|---|---|
| People | 84.1 | 89.8 | 89.6 |
| Places | 93.6 | 99.6 | 97.8 |
| Organizations | 83.7 | 91.9 | 89.5 |
| Overall | 86.8 | 93 | 91.4 |

As can be seen in Tables 3 through 6, the approach provided by the embodiments of the invention retrieves an average of approximately 24% (when the entire document is used, 36.3% window around the query term) of the correct pages in the top ten results.

Generally, the embodiments of the invention mechanically disambiguate entity references on web pages. First, the conventions by which the authors of the pages expect their human readers to perform this task are provided. In this regard, some observations are noted that are gained from a manual analysis of a large number of web pages. From these observations, an expressive model of reference is developed.

Web pages (or at least entry points into sets of pages) have to make sure that when they use an ambiguous term such as 'Asha', the reader can determine which Asha they are referring to. This is typically accomplished by providing a description of the Asha that disambiguates it from the other Ashas. Different kinds of descriptions are used to refer to different kinds of entities. Some of the most frequent types of descriptions include:

- Location information such as the place one is from or the place where one is located; e.g., John Smith of Palo Alto, Calif.; Akron, Ohio, etc.
- Organization and type of affiliation with the organization (position, university graduated from); e.g., Mary Brown, county clerk, Berkeley county, Ohio.
- Expertise, occupation, goal of the entity; e.g., Michael Jordan, basketball player. Asha, an action group for basic education in India
- Relation to another person; e.g., Barbara Johnson, wife of Mr. J. Seward Johnson, Sr., co-founder of Johnson & Johnson
- The type of the entity; e.g., Mustang® car, Gibson® guitar, etc.

Descriptions may be explicitly or implicitly associated with the reference. For example, a page about computing eigen vectors may use the term "matrix" without appending a description to it. The relationships stated on the page between the matrix of that page and concepts such as eigen vectors can be construed as the description of matrix. Similarly, a page about the Mustang® car might refer to Ford® Motor Company without an explicit description. Again, the use of the term and its relation to other terms as stated on the page is its description.

The user is expected to bootstrap from sharing (with the author) the denotation of some terms (such as the names of types of entities, places, big organizations, and famous people) to the denotation of the entity being described. The description is expected to pick out the one and only matching entity from a contextually defined set of entities.

A deterministic model is constructed as follows. The linguistic practice of identifying entities using descriptions can be captured using first order logic. The description corresponds to the first order logic formula $\phi$, with exactly one free variable. Given a set Δ, if exactly one object O in Δ satisfies φ, then φ can be used to refer to O. If O does not have a usable name, either because it does not have one or because its name is not shared with the reader, or because it is ambiguous, φ can be used to refer to it. If the names for the terms in φ, call them $V_φ$, are more likely to be unambiguously shared than the name for O, φ provides a more robust reference for O than O's name. Furthermore, φ enables one to leverage sharing names for $V_φ$ to refer to O. Descriptions on web pages can be interpreted as follows. The set of potential denotations of Asha, Δ, is contextually assumed by a page. The Δ associated with a page is referred to as its context. A description φ can be evaluated against this context to yield the object it refers to.

Descriptions can be used even without evaluating them. If two pages can be assumed to use the same context and they each refer to an entity using the same φ, which is discriminant in this context, then the two references can be assumed to be to the same entity.

For example, considering two pages, both of which say, "James Smith, the MIT Professor . . . ." This identifies an entity, which satisfies the following description:

firstName(x, 'James')∧lastname(x, 'Smith')∧
position(x, Professor)∧worksFor(x, MIT)

If it is assumed that the contexts associated with the two pages are the same, it can be concluded that the James Smith referred to on the two pages is the same. If the contexts are different, the James Smiths would be different; e.g., if one of the pages was set in the context of the year 1920 while the other was in the context of the year 1990, the two James Smiths are likely to be different.

In this example, the shared vocabulary (such as firstName and lastName) concepts such as "Professor" and well-known entities such as "MIT" are being leveraged to communicate the reference to James Smith. The terms "Professor" and "MIT" in the formula are not words, but rather, are objects in the domain of discourse. The processing which goes from the phrase "James Smith, the MIT Professor . . . " to the formula is assumed to have done the mapping from the words to the objects. Of course, the two pages could have meant different objects with the word "MIT" (such as Massachusetts Institute of Technology vs. Maharashtra Institute of Technology) or even different concepts by the word "Professor". In such cases, if there is ambiguity over the words used to describe the entity, the objects they refer to could be different.

In other words, discriminant descriptions that use only well-known terms are used to refer to objects. Occurrences of the same discriminant description on different documents can be assumed to co-refer, so long as their contexts are the same. Hence, if formal descriptions from web pages can be extracted and it can be assumed that these descriptions are discriminant and they use the same context, the aforementioned selection and elimination problems can be solved With regard to a probabilistic extension, there are two sources of "messiness" (leading to uncertainty) that are considered. The first source is from the process of extracting the description. One can use a mixture of techniques to construct fragments of the logical description of the entity implied by the words on the page. Some of these techniques can be precise and yield descriptions that accurately reflect the meaning of the words on the page. Other techniques are more approximate and have a high uncertainty associated with the description. To represent this uncertainty, each arc of the graph can have a probability associated with it.

Therefore, for example, if the words 'Asha' and 'Stanford' both occur in a document, in close proximity, there is a high likelihood the Asha in the document has some relation to Stanford. However, without a better understanding of the document (which is often even more difficult than natural language understanding, given the use of table, frames, etc. on web pages), one cannot be certain that Asha is indeed related to Stanford. As such, one can use probabilities to capture this uncertainty.

In addition to using probabilities to capture the uncertainty in the extraction process, one can also use more general relationships that capture the imprecision in the extraction techniques. Thus, for example, though the phrase 'Asha, Stanford' can be assumed to state a relationship between Asha and Stanford, it is not possible to determine whether this relationship is graduatedFrom, studentOf, employedBy, etc. without a high quality natural language understanding of the rest of the document. In such a case, one can use a more general relationship such as hasAffiliationTo between Asha and Stanford.

Another source of uncertainty arises from the process of mapping words in the description to objects in the domain. For example, the word 'Stanford' could refer to the university, to any of a number of towns by that name, or to one of a number of businesses that are called Stanford. This corresponds to the issue of identity uncertainty in PRMs (Probabilistic Relational Models).

Even if one is given precise descriptions (i.e., one can be sure that the description accurately reflects the content of the page), there is uncertainty in whether the description is discriminant (or alternately, in the context assumed by the page). For example, two pages might both identify an Asha as a student of Stanford. But since there may possibly be multiple Ashas who are students of Stanford, one cannot be sure that the Ashas on the two pages are the same. However, knowing that both are students of Stanford does increase the likelihood that they are the same. Indeed, in most cases, all one has to go on are such partial, highly non-discriminant descriptions. Fortunately, since one goal is only to sort the pages in terms of the likelihood of their referring to the intended Asha, one can get quite far even with such partial descriptions. This source of uncertainty is not reflected in the representation, but in the process of using descriptions to infer co-reference.

Just as commonality in descriptions helps one infer that two references are to the same entity, differences in descriptions can imply that two references are to different entities. For example, since most people have only one profession, if the Ashas on two pages have different professions, it is likely that they are different. In the present corpus, one of the "Lisa Browns" is a boxer and another is a senator. Since the likelihood of someone being both a boxer and senator is very low, this can be used to infer that two references to "Lisa Brown" on two pages, one which describes her as a boxer and another which describes her as a senator are references to different entities.

Formally, if two pages A and B include the descriptions $φ_A$ and $φ_B$, one would like to compute the probability that the entities each of them describes are the same conditioned on the information that they satisfy $φ_A$ and $φ_B$, respectively; i.e., $P(x=y|φ_A(x)∧φ_B(y))$.

The examples used herein are restricted to shared descriptions, i.e., to $P(x=y|φ(x)∧φ(y))$. Given a set of pages, one of which are designated as the base web page, with each page containing a description of an entity whose name matches the search query, one can sort them in terms of their likelihood of referring to the same entity as the base web page by using these conditional probabilities.

One problem facing a straight forward implementation of this approach is the very large number of conditional probabilities required. Accordingly, some restrictions and assumptions that reduce the number of probabilities required are provided as follows. In a simplified reference model, a number of restrictions are made to ameliorate the problem of having a large number of conditional probabilities. Under these restrictions, the probabilistic first order logic model reduces to an algebraic model.

First, a restriction is made to $\phi$ of the form $p_1(x, a_1) \wedge p_2(x, a_2) \wedge \ldots p_n(x, a_{n \text{ where the } a_i}$s are constants. Also, a restriction is made to an extremely general $p_i$s such as isAffiliatedWith each with a range (such as Organization or Person) such that the ranges of the different $p_i$ are disjoint. Under this simplification, each $a_i$ is in at most one relation to x.

This restricted class of descriptions defines a vector space where the dimensions correspond to the different $a_i$. If one assumes the different $p_i(x, a_i)$ are independent, then these dimensions become orthogonal. The coordinates of a document along a dimension $a_i$ correspond to the uncertainty associated with the extraction process (i.e., how certain is it that the document says $p_i(x, a_i)$). One can define various similarity measures on this space.

As previously mentioned, a problem occurs when some of the terms in the description themselves are ambiguous. For example, in 'Asha, Stanford', the word "Stanford" might refer to the university, one of the many towns with that name or a business. Because of the restriction on the structure of $\phi$, one can get around this problem by allowing both words and objects to be dimensions. In the earlier example of 'Asha, Stanford', rather than trying to resolve the reference of "Stanford", one can treat the word "Stanford" as a dimension. To keep the dimensions orthogonal, both the object "Stanford University" and the word "Stanford" cannot be dimensions at the same time. If two pages both say 'Asha, Stanford', and one uses the word "Stanford" (as opposed to the objects that it could denote) as a dimension, the similarity measure now has to factor in the likelihood that the two documents are referring to the same Stanford.

If the dimensions are restricted to be only words, the model reduces to a subspace of a vector space model. The dimensions of this subspace are the names for objects that are used in descriptions. This subspace is referred to as the Description (Desc.) Subspace or DS.

Next, given the vectors corresponding to two documents, one needs to compute the likelihood that the Asha they refer to are the same. This is accomplished as follows. One type of similarity measure that can be used is the Term Frequency Inverse Document Frequency (TFIDF) methodology on the description subspace.

Accordingly, a new similarity measure is developed (specific to the selection and elimination problems) from the first principles. The intuition is that for the purpose of determining whether two references to Asha are to the same entity, based on their sharing a description, one has to consider properties of the domain, not just of the corpus. More specifically, one must look at the number of objects in the domain that satisfy the description, not the number of occurrences of the descriptive terms in the corpus. The following example illustrates why this should be the case. There are far fewer presidents of the United States than there are postmen in the United States. If two pages claim that x is a U.S. president, they are far more likely to be referring to the same person than if they both say that x is a postman. However, there are far more references to U.S. presidents on the web than there are to postmen. Since one goal is to determine whether the references on the two pages are the same, one should pay attention to the number of objects in the domain, not to the number of references to these objects in the corpus. In the present empirical evaluation, it is demonstrated that this similarity measure out-performs the TFIDF measure in the description subspace and is more robust.

Each dimension is considered and the prior probability ($a_i$) of an entity (x) in the domain satisfying $p_i(x, a_i)$ (i.e., having a coordinate 1 along the dimension i) is computed. Then, a computation is made of the aggregate probability (a) of an entity satisfying $\phi$; i.e., of satisfying $p_i(x, a_i) \wedge p_j(x, a_j) \ldots$) or equivalently, of having a certain vector $V_\phi$. Then, assuming independence between the dimensions, the probability ($\beta$) of two references in the corpus is computed, to entities which have the same vector, being the same.

Let the underlying domain of entities be S and let the cardinality of S be K. Let $N_i$ of these entities have a non-zero value along the dimension i. Then, the probability of a randomly chosen entity from the domain having a non-zero value along this dimension ($\alpha_i$) is $N_i/K$.

For example, if the dimension i is Stanford University, it is desired to have the probability of a randomly chosen entity in the corpus be affiliated with Stanford University. If S is the set of people in the United States, $K \approx 260$ million and $N \approx 40,000$ (including staff, alumni, etc.), yielding $\alpha_i \approx 1.54 \times 10^{-4}$. Alternatively, one could have considered the population of the world instead of just the United States. But as explained below, the exact value of K is not important so long as the same value is used uniformly. The number 40,000 is a measure of the network of relations that Stanford participates in.

The coordinate of a document d along a dimension i reflects the uncertainty associated with the document and the dimension. When this value ($c_{i,d}$) is 1 (i.e., there is no uncertainty), it is desirable that $\alpha_i$ be unchanged. When this value is 0 (i.e., there is so much uncertainty that this dimension should be ignored), it is desirable that $\alpha_i=1$. This effect is obtained by multiplying $\alpha_i$ to get:

$$1 - c_{i,d}(1 - \alpha_i) \qquad (1)$$

Given the independence of the different dimensions, the overall probability a of an entity having the vector $V_\phi$ is:

$$\alpha = \prod_{i=1}^{|S|} \alpha_i \qquad (2)$$

As before, this function can be multiplied with the uncertainty associated with each dimension. In the case where the dimension $w_i$ is a word (or phrase), it is desirable to account for the probability that the two documents are referring to the same denotation of the word. This is accomplished by expanding $N_i$ to include all objects x such that $p_i(x, a_i)$ for all $a_i$ that are possible denotations of $w_i$.

For sufficiently large K, one can expect $K\alpha$ entities to have the vector $V_\phi$. If references to entities in the corpus follow a uniform distribution, then the probability of two randomly chosen entities both of which have the vector $V_\phi$ also being the same is $\beta=1/(K\alpha)$. The assumption of a uniform distribution means that every entity in the domain is equally likely to appear in the corpus. This may be appropriate in certain corpuses (such as employee records) but is inappropriate for the web.

Some of the people affiliated with Stanford occur on many more web pages than most others. On the web, many phenomena exhibit power law distributions. According to such distribution, for v (up to $\sqrt{2K\alpha}$) of the $K\alpha$ entities, the probability of a randomly chosen reference corresponding to a particular one of these v is $Gv^{-u}$ where G and u are constants. (Since $$\sum_{v=1}^{\sqrt{2}N_i} Gv^{-u} = 1,$$

given u, then G can be computed.) What this says is that a small number of entities appear on many pages but the majority of entities appear on very few (or no) pages. In this case, $\beta$ is given by:

$$\beta = \sum_{v=1}^{\sqrt{2K\alpha}} G^2/v^{1+2u} \quad (3)$$

In general, one cannot expect to know K, except that in contexts such as the web, it is very large. However, since only different documents are being compared, it is not necessary to know exact probabilities. Furthermore, once G (or u) is fixed, the likelihood of two documents co-referring is a monotone function of $1/\alpha$. In fact, independent of the distribution, the comparisons can be performed based purely on $1/\alpha$, which in turn is directly proportional to the size of the network associated with the terms corresponding to the vector. Since the ability of a descriptive term is inversely proportional to its network size, this similarity measure is referred to as Inverse Network Size or INS. $INS_{ab}$, the similarity measure between documents a and b, is given by:

$$INS_{ab} = \prod_{i=1}^{|S|} \begin{cases} N_i/K, \\ 1, \end{cases} \quad (4)$$

if the $i^{th}$ dimension occurs in a and b otherwise where $N_i$ is the network size of the $i^{th}$ dimension and K is largest such network size.

Two documents are more likely to refer to the same Asha if their INS is small.

The network size of a term is analogous to the role played by the Inverse Document Frequency (IDF) in the standard vector space model. IDF measures the significance of a term in a corpus. Network size measures the ability of an object or word (or more generally, formula) to identify some other object. This data is easily available for objects such as places, professions, and organizations that are frequently used in descriptions.

Though it is tempting to create an analog of Term Frequency (TF), it is not really meaningful in the present context. Since $p_i(x, a_i) \land p_i(x, a_i)$ is logically equivalent to just $p_i(x, a_i)$, the number of times a descriptive element occurs in a document is of no significance (other than possibly increasing the likelihood that the document does indeed say $p_i(x, a_i)$).

The above-described models are experimentally considered in implementations of a number of different approaches including: using the TFIDF similarity measure on the standard vector space; the TFIDF similarity measure on the description subspace; and the INS similarity measure on the description subspace. For each approach, both the entire document and a window of 100 words around occurrences of the query term are considered.

Experimentally, first, the applicability of the TFIDF similarity measure over the standard vector space for the selection and elimination problems is tested. To ensure that the IDFs are not biased by the relatively small size of the test corpus, a set of 1.6 million web pages, which included the corpus as a subset, are obtained from which IDFs are computed. All processing is performed after stemming the words on the pages with the well-known Porter stemmer. The similarity is computed based on the entire document as well as a variety of windows of different sizes around occurrences of the search query. The best results, as graphically illustrated in FIGS. 2 through 5, are obtained with a rather large window of 100 words on either side of the search query.

With regard to the INS over Description Subspace, as previously mentioned, a description of a person, place, product, or organization is typically made in terms of the type of the entity and its relations to other places, organizations, professions, etc. Consequently, the present dimensions are a set of organizations, professions, types, and places. This set (the KB) was obtained from obtained from the U.S. Census Bureau and from other sources. Population estimates (from the census bureau) are used as the network size for places. Similarly, census estimates on occupations are used to obtain network sizes for the professions. In contrast to professions, places and types for which fairly exhaustive lists are used, only a few hundred organizations are chosen for which network sizes are manually provided based on estimates of the number of entities associated with that organization.

Descriptions/vectors based on the entire document as well as a window of 100 words around the query term are then computed. It is desirable to use a design that can be adopted by a web scale search engine with minimal modifications to its existing infrastructure. In particular, it is desirable to avoid any changes to the search index. Indeed, the embodiments of the invention go one step further and simply use a standard word document map that is part of any search index. The uncertainty associated with extracting the description from the document is ignored; i.e., if a term occurs in a document or in a window around the query term, the document gets a coordinate of 1 along the dimension corresponding to that term. This approach to extracting descriptions based purely on co-occurrence (possibly within a window) may be unable to distinguish between "Senator Lisa Brown" and "Lisa Brown saw the Senator". Both of these phrases will associate Senator with Lisa Brown. Still, the simplicity of this approach makes it very attractive. That fact that even such a simple approach provides very good results reflects on the discriminative ability of descriptions on the web.

The $\alpha_i$s and word document maps are stored in a relational database and the code to aggregate the probabilities and sort the documents are implemented as a pen script. Running on a 700 MHz X86 PC Linux® machine with 256 MB of memory, the prototype is capable of sorting 400 pages a second. From this, it seems that a more optimized implementation running on a cluster of machines can provide this feature to a large number of users on a web search engine.

In addition to TFIDF over the standard vector space and INS over the description subspace, the experiment is also applied to the TFIDF over the description subspace. To do this, the dimensions of the vector space corresponding to the terms in the KB. The coordinate of each term (the TF) is binary (either the term occurs or does not occur). The IDFs are computed over the documents in the corpus. Again, FIGS. 2 through 5 illustrate the results based on the entire document as well as a window of 100 words around the query term.

The implementation of this measure is generally identical to that of INS over the description subspace and approximately the same number of pages is processed per second. As previously described, the evaluation is performed on a set of pages corresponding to ten search queries. Pages corresponding to 20 entities (10 people, 5 places and 5 organizations) are used as base web pages and all the other pages corresponding to that search query (an average of 76.4) and are compared to the base web page using the methodology being evaluated.

Tables 3 through 6 summarize the results (for N=10), of using TFIDF on the standard vector space, of using INS on the description sub-space, and using TFIDF on the description subspace. For each case, both the entire document and a window of 100 words around the query term are considered. Tables 3 and 4 are for the selection problem. Tables 5 and 6 are for the elimination problem. In addition to the overall results obtained by averaging over the 20 unique entities, results broken down by the type of entity are also provided.

As can be seen in Tables 3 through 6 and FIGS. 2 through 5, the INS over the description subspace approach significantly outperforms the TFIDF over the standard vector space approach, both overall and within each category. More importantly, the overall performance of over 85% achieved by the embodiments of the invention is good enough to make a noticeable difference for users. In particular, in the case of people (over 92%). Because over 10% of all searches on the web are about people, this is a significant category.

It is interesting that restricting one's attention to a window around an occurrence of the search query does not always improve the performance. One would expect that such a window would contain most of the relevant description. The reason for this unexpected behavior is that while windowing generally improves performance, in some cases, because of the structure of web pages, important portions of the description are textually far from the occurrence of the search query. Some descriptions, such as "Lisa Brown, the Senator from Spokane" occur close to the entity being described. On other pages, such as those announcing event schedules, elements of the description might occur in a heading or sub-heading. For example, the word "Boxer", which is part of the description of the "Lisa Brown" on one particular web page, appears in the top heading, far from the occurrence of the term "Lisa Brown". In other examples, the descriptive element occurs in a somewhat nearby, but not very close sub-heading. This also explains why a rather large window size of 100 words yields the best results for windowing.

Surprisingly, applying TFIDF measures to the description subspace does almost as well as INS on the description subspace. However, when the descriptive terms are drawn from a window around the query term (as opposed to the entire document), unlike the INS measure, the TFIDF measure suffers a significant drop in performance. This suggests that it is not as robust as INS. Still, given that TFIDF measures do not require data about the network size of the various dimensions, their performance seems to suggest that they might be a good tradeoff.

The comparatively poor result (73.6%) for places (over the entire document) is, at first glance, surprising, since most cities, including those in the corpus, are easily disambiguated by the state in which they occur. So, for example, even though there are several cities in the United States called "Springfield", no two of them occur in the same state. The problem in this case turns out to be the technique for extracting the main text of a page from HTML (HyperText Markup Language). Many of the top pages retrieved by search engines (for queries referring to cities) are from sites offering accommodations in that city. Many of these pages contain navigation links that mention all the other states. As expected, when the focus is on a window around the query term, the performance improves to 85%.

With respect to the elimination problem, overall, the performance of all the approaches appears adequate. This is to be expected, given that a methodology that randomly sorts the results will ensure that only two of the top ten results will refer to the same Asha as the base web page.

Figure 2:
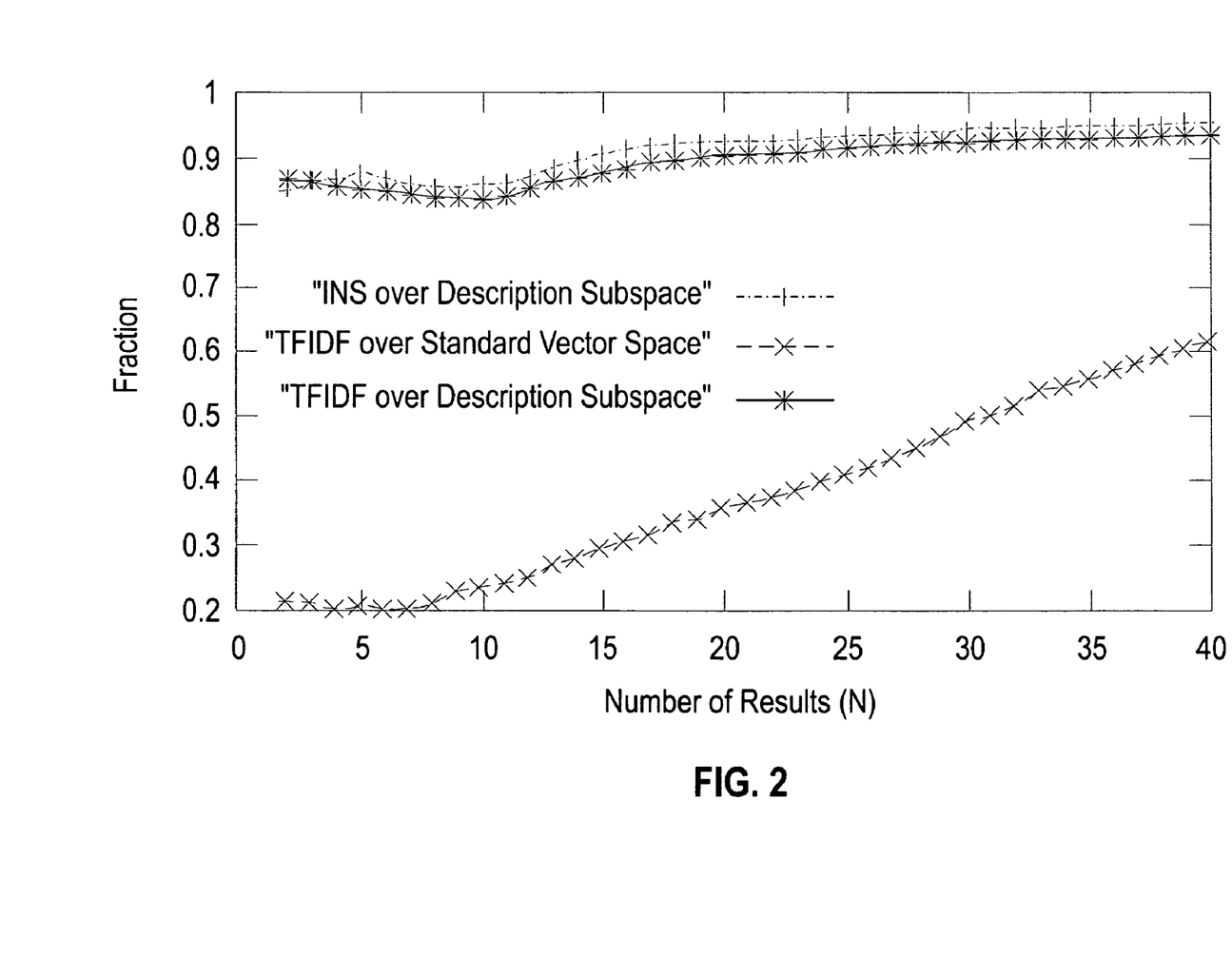
FIG. 2 illustrates a graphical representation of the fraction of correct results in the first N results, looking at an entire document according to an embodiment of the invention.
Figure 3:
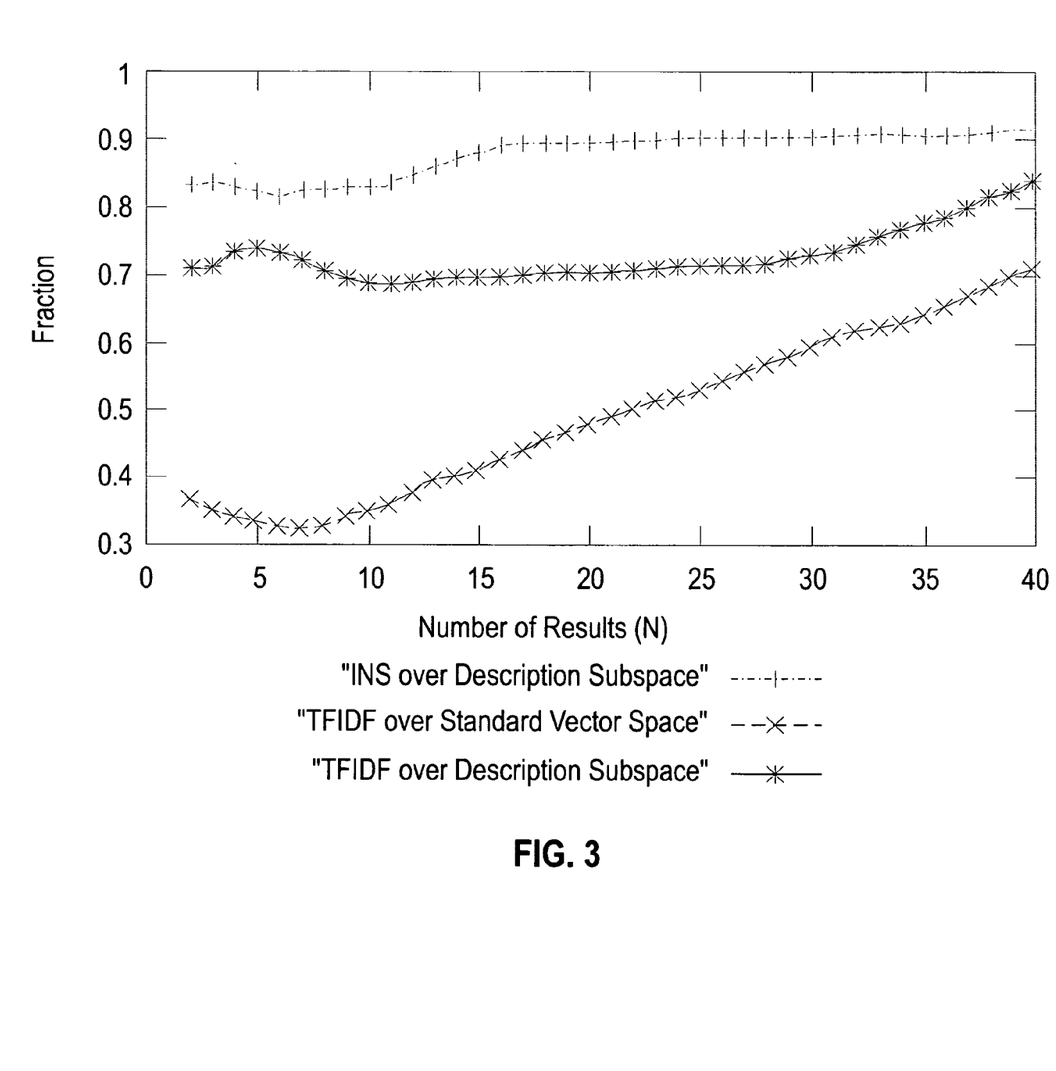
FIG. 3 illustrates a graphical representation of the fraction of correct results in the first N results, looking at a 100 word window according to an embodiment of the invention.
Figure 4:
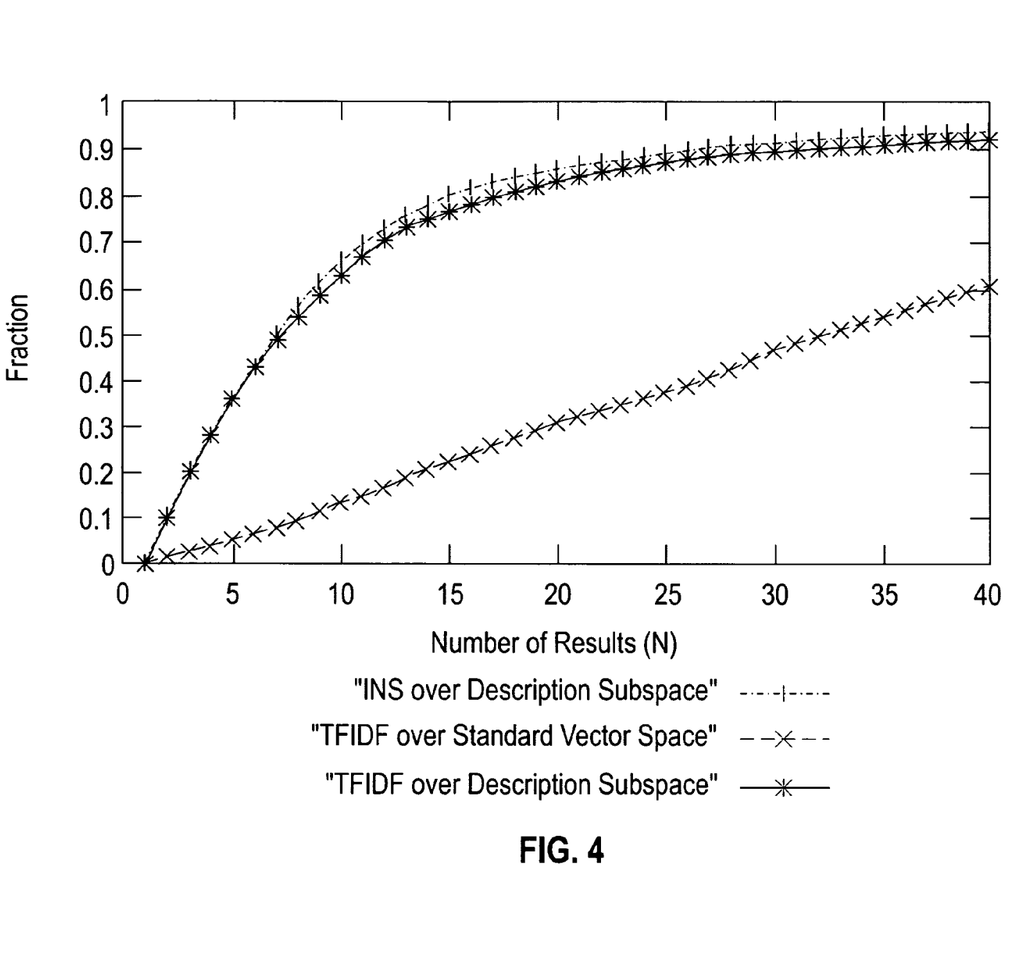
FIG. 4 illustrates a graphical representation of the fraction of correct pages included in the first N results, looking at an entire document according to an embodiment of the invention.
Figure 5:
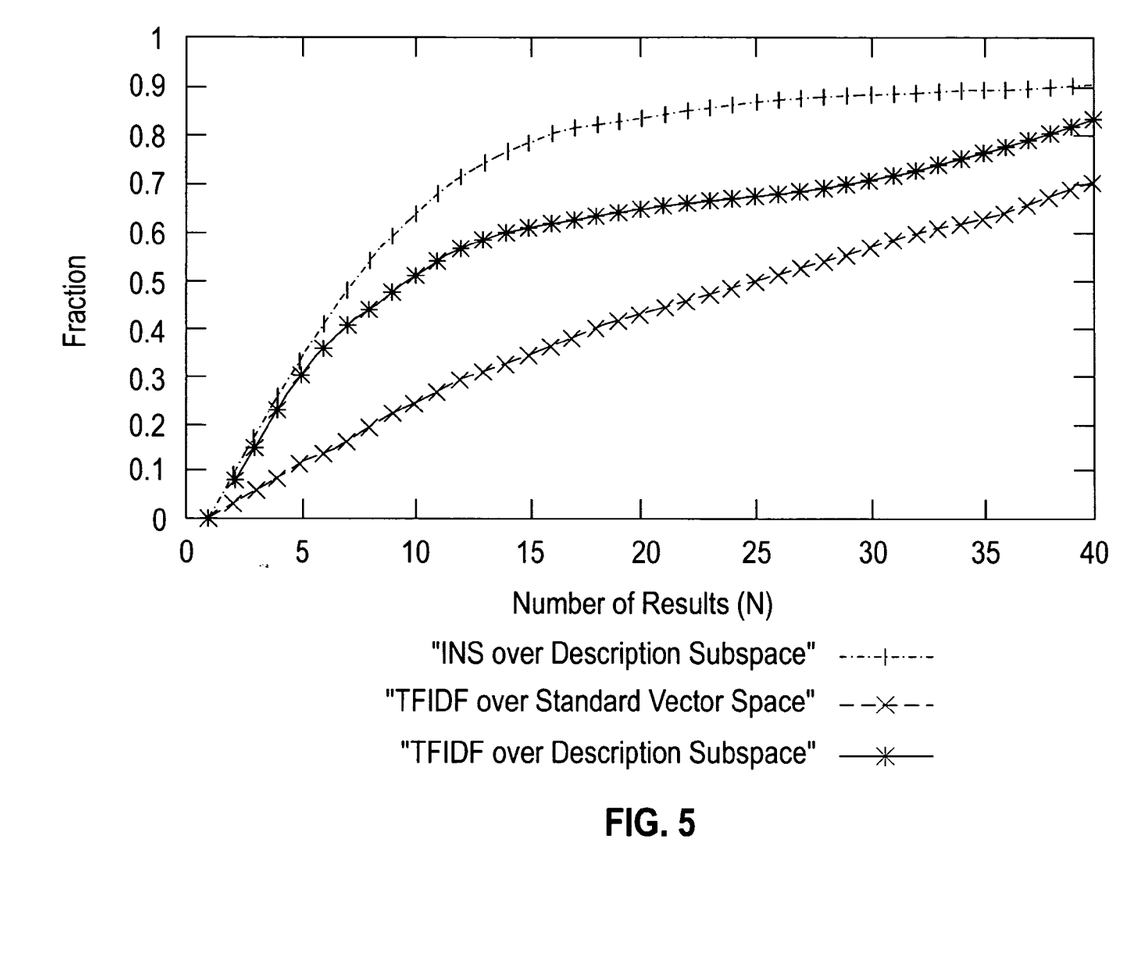
FIG. 5 illustrates a graphical representation of the fraction of correct pages included in the first N results, looking at a 100 word window according to an embodiment of the invention.

FIG. 2 (over the entire document) and FIG. 3 (over a window) provide a more detailed look at the precision for various N. In addition to the number of correct results in the top N, of additional interest is the fraction of the total number of correct results that are in the top N. FIG. 4 (over the entire document) and FIG. 5 (over a window) provide the fraction of the top N results that refer to the intended Asha.

Vector space based similarity measures only identify documents that are overall considered similar. When the document is coherent (i.e., about a single topic), this similarity correlates well with entity co-reference. On the other hand, with web pages which are a collection of snippets, similarity between documents does not correlate with entity co-reference. For example, two documents may both refer to the same Lisa Brown, the Senator from Spokane, Wash. However, the two documents may be about very different topics. One could be a web page about the Audubon society and the other could be a page about Gonzaga University pertaining to its continuing education program. However, both documents contain the references to the position "Senator" and the place "Spokane" in close proximity to the reference to "Lisa Brown" (though not in a grammatical sentences) and that is adequate to lead one to believe that the Lisa Browns they refer to are the same. Further, this conclusion is warranted not by properties of the corpus, but by properties of the domain (i.e., that there is typically only one senator associated with a place of the size of Spokane).

The embodiments of the invention provide a simple user interface, a reference model based on descriptions, and evaluate different mechanisms for solving the problem. The embodiments of the invention achieve a precision of 85% in an empirical evaluation of the inventive solution.

Figure 6:
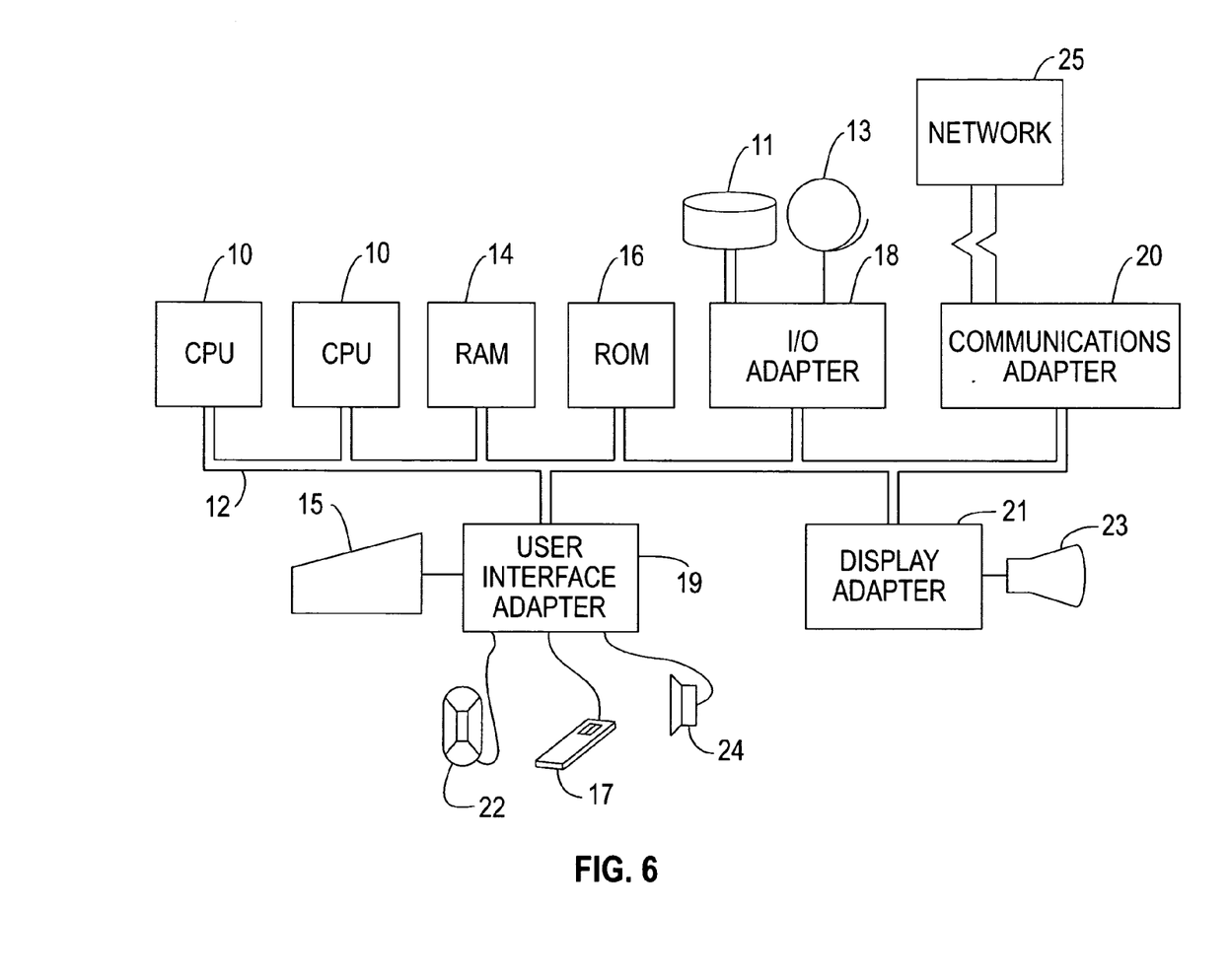
FIG. 6 illustrates a schematic of a computer system diagram according to an embodiment of the invention.

A representative hardware environment for practicing the embodiments of the invention is depicted in FIG. 6. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 7:
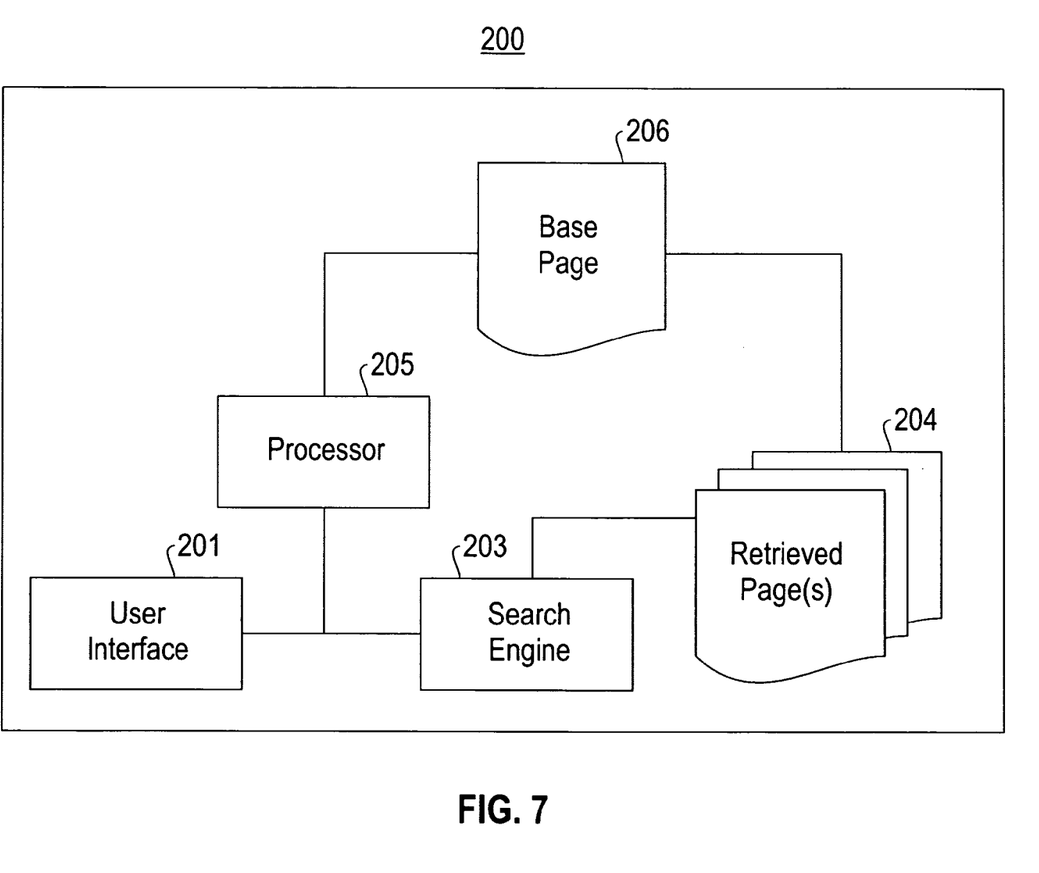
FIG. 7 illustrates a schematic of a system diagram according to an embodiment of the invention.

Generally, as shown in FIG. 7, the embodiments of the invention provide a system 200 for disambiguating entities in a computerized web search, wherein the system 200 comprises a user interface 201 adapted to identify a set of potential meanings for an entity; a search engine 203 connected to the user interface 201 and adapted to retrieve at least one web page 204 comprising descriptions referencing the entity; and a processor 205 connected to the user interface 201 and search engine 203 and adapted to establish a base web page 206 comprising a selected context for the entity; attribute dimensions of a vector space attributed to domains in the retrieved web page 204; and compute a probability of similarity between the referenced entity in the retrieved web page 204 and the entity in the base web page 206, wherein the entity preferably comprises any of a word and phrase, and wherein the dimensions preferably comprise any of an object and a word.

Preferably, the at least one web page 204 comprises a plurality of web pages 204, wherein each web page 204 comprises a description of the entity that matches a search entity chosen for a search query, and wherein the base web page 206 is selected from one of the web pages 204. Additionally, the processor 205 is preferably adapted to correspond a similarity measure between the dimensions of the vector space attributed to domains in the retrieved web page and a likelihood of the retrieved web page referring to the entity in the base web page. Furthermore, the search engine 203 is preferably adapted to rank web pages based on the computed probability of similarity.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method of disambiguating entities in a computerized web search, said method comprising:
   identifying a set of potential meanings for an entity, wherein said entity comprises any of a word and phrase;
   retrieving at least one retrieved web page comprising descriptions referencing said entity;
   establishing a base web page comprising a selected meaning of said potential meanings for said entity;
   attributing dimensions of a vector space attributed to domains in said retrieved web page;
   computing a probability of similarity between said descriptions in said retrieved web page and said entity in said base web page,
   wherein said computing of said probability of similarity comprises corresponding a similarity measure between said dimensions of said vector space attributed to domains in said retrieved web page and a likelihood of said retrieved web page referring to said entity in said base web page; and
   reporting said probability of said similarity to a user.

2. The method of claim 1, all the limitations of which are incorporated herein by reference, wherein said dimensions comprise any of an object and a word.

3. The method of claim 1, all the limitations of which are incorporated herein by reference, wherein said at least one web page comprises a plurality of web pages, wherein each web page comprises a description of said entity that matches a search entity chosen for a search query.

4. The method of claim 3, all the limitations of which are incorporated herein by reference, wherein said base web page is selected from one of said web pages.

5. The method of claim 1, all the limitations of which are incorporated herein by reference, further comprising ranking web pages based on the computed probability of similarity.

6. A program storage device readable by computer, tangibly embodying a program of instructions executable by said computer to perform a method of disambiguating entities in a computerized web search, said method comprising:
   identifying a set of potential meanings for an entity, wherein said entity comprises any of a word and phrase;
   retrieving at least one retrieved web page comprising descriptions referencing said entity;
   establishing a base web page comprising a selected meaning of said potential meanings for said entity;
   attributing dimensions of a vector space attributed to domains in said retrieved web page;
   computing a probability of similarity between said descriptions in said retrieved web page and said entity in said base web page,
   wherein said computing of said probability of similarity comprises corresponding a similarity measure between said dimensions of said vector space attributed to domains in said retrieved web page and a likelihood of said retrieved web page referring to said entity in said base web page; and
   reporting said probability of said similarity to a user.

7. The program storage device of claim 6, all the limitations of which are incorporated herein by reference, wherein in said method, said dimensions comprise any of an object and a word.

8. The program storage device of claim 6, all the limitations of which are incorporated herein by reference, wherein in said method, said at least one web page comprises a plurality of web pages, wherein each web page comprises a description of said entity that matches a search entity chosen for a search query, and wherein said base web page is selected from one of said web pages.

9. The program storage device of claim 6, all the limitations of which are incorporated herein by reference, wherein said method further comprises ranking web pages based on the computed probability of similarity.

10. A system for disambiguating entities in a computerized web search, said system comprising:
   a user interface adapted to identify a set of potential meanings for an entity, wherein said entity comprises any of a word and phrase;
   a search engine connected to said user interface and adapted to retrieve at least one retrieved web page comprising descriptions referencing said entity;
   a processor adapted to:
      establish a base web page comprising a selected meaning of said potential meanings for said entity;
      attribute dimensions of a vector space attributed to domains in said retrieved web page; and
      compute a probability of similarity between said descriptions in said retrieved web page and said entity in said base web page,
   wherein said computing of said probability of similarity comprises corresponding a similarity measure between said dimensions of said vector space attributed to domains in said retrieved web page and a likelihood of said retrieved web page referring to said entity in said base web page; and a display adapted to report said probability of said similarity to a user.

11. The system of claim 10, all the limitations of which are incorporated herein by reference, wherein said dimensions comprise any of an object and a word.

12. The system of claim 10, all the limitations of which are incorporated herein by reference, wherein said at least one web page comprises a plurality of web pages, wherein each web page comprises a description of said entity that matches a search entity chosen for a search query.

13. The system of claim 12, all the limitations of which are incorporated herein by reference, wherein said base web page is selected from one of said web pages.

14. The system of claim 10, all the limitations of which are incorporated herein by reference, wherein said search engine is adapted to rank web pages based on the computed probability of similarity.

* * * * *